US012644474B2

(12) United States Patent
Hansen

(10) Patent No.: US 12,644,474 B2
(45) Date of Patent: Jun. 2, 2026

(54) HAND TOOL POWERED HYDRAULIC FLUID PUMP DEVICE

(71) Applicant: Mike Hansen, Brandon, SD (US)

(72) Inventor: Mike Hansen, Brandon, SD (US)

( * ) Notice: Subject to any disclaimer, the term of this patent is extended or adjusted under 35 U.S.C. 154(b) by 0 days.

(21) Appl. No.: 18/951,220

(22) Filed: Nov. 18, 2024

(65) Prior Publication Data

US 2026/0139693 A1 May 21, 2026

(51) Int. Cl.
*F15B 1/26* (2006.01)
*F04B 23/02* (2006.01)

(52) U.S. Cl.
CPC .............. *F15B 1/26* (2013.01); *F04B 23/023* (2013.01); *F04B 23/028* (2013.01)

(58) Field of Classification Search
CPC ......... F04B 23/023; F04B 23/028; F15B 1/26
See application file for complete search history.

(56) References Cited

U.S. PATENT DOCUMENTS 2,651,545 A 9/1953 Shotton
4,278,136 A 7/1981 Hansson
5,201,638 A * 4/1993 Bieri ......................... F15B 1/26 D34/25
5,715,869 A 2/1998 Patterson
6,218,746 B1 4/2001 Gouge, Jr.
7,811,072 B2 * 10/2010 Mitchell ................. F04C 23/02 418/205
11,346,347 B2 5/2022 Smith
11,628,594 B2 * 4/2023 Schock ................. B28B 7/0041 425/441
2006/0168956 A1 * 8/2006 Sakai ........................ F15B 1/26 60/473
2006/0210409 A1 9/2006 Summer
2014/0169997 A1 * 6/2014 Ibatici ..................... F15B 15/18 417/410.4
2018/0066681 A1 * 3/2018 Cornett ................. F15B 13/042

FOREIGN PATENT DOCUMENTS

CA 232448 12/2002
EP 0866210 1/2004
EP 2378126 A2 * 10/2011 ........... F04D 13/021

* cited by examiner

*Primary Examiner* — Matthew Wiblin

(57) ABSTRACT

A hand tool powered hydraulic fluid pump device provides hydraulic power driven by a hand tool to enhance portability. The device includes a wheeled cart with a handle for transporting a hydraulic fluid reservoir. A pump is positioned in the reservoir. A flow diverter is coupled to the pump for delivering and returning hydraulic fluid through a first fluid channel and a second fluid channel fluidly connected to a first connection port and a second connection port. A hand tool is removably couplable to a pump shaft of the pump to actuate the pump and provide hydraulic fluid to a hydraulically powered machine.

12 Claims, 5 Drawing Sheets

HAND TOOL POWERED HYDRAULIC FLUID PUMP DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hydraulic fluid device and more particularly pertains to a new hydraulic fluid device for providing hydraulic power driven by a hand tool to enhance portability.

(2) Description of Related Art Including Information Disclosed Under 37 CFR 1.97 and 1.98

The prior art relates to hydraulic fluid devices. Known prior art devices include power takeoff and fluid takeoff devices for powering hydraulic machines. Known prior art lacks an independently portable unit providing hydraulic fluid powered by a hand tool.

BRIEF SUMMARY OF THE INVENTION

An embodiment of the disclosure meets the needs presented above by generally comprising a wheeled cart with a handle for transporting a hydraulic fluid reservoir. A pump is positioned in the reservoir. A flow diverter is coupled to the pump for delivering and returning hydraulic fluid through a first fluid channel and a second fluid channel fluidly connected to a first connection port and a second connection port. A hand tool is removably couplable to a pump shaft of the pump to actuate the pump and provide hydraulic fluid to a hydraulically powered machine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
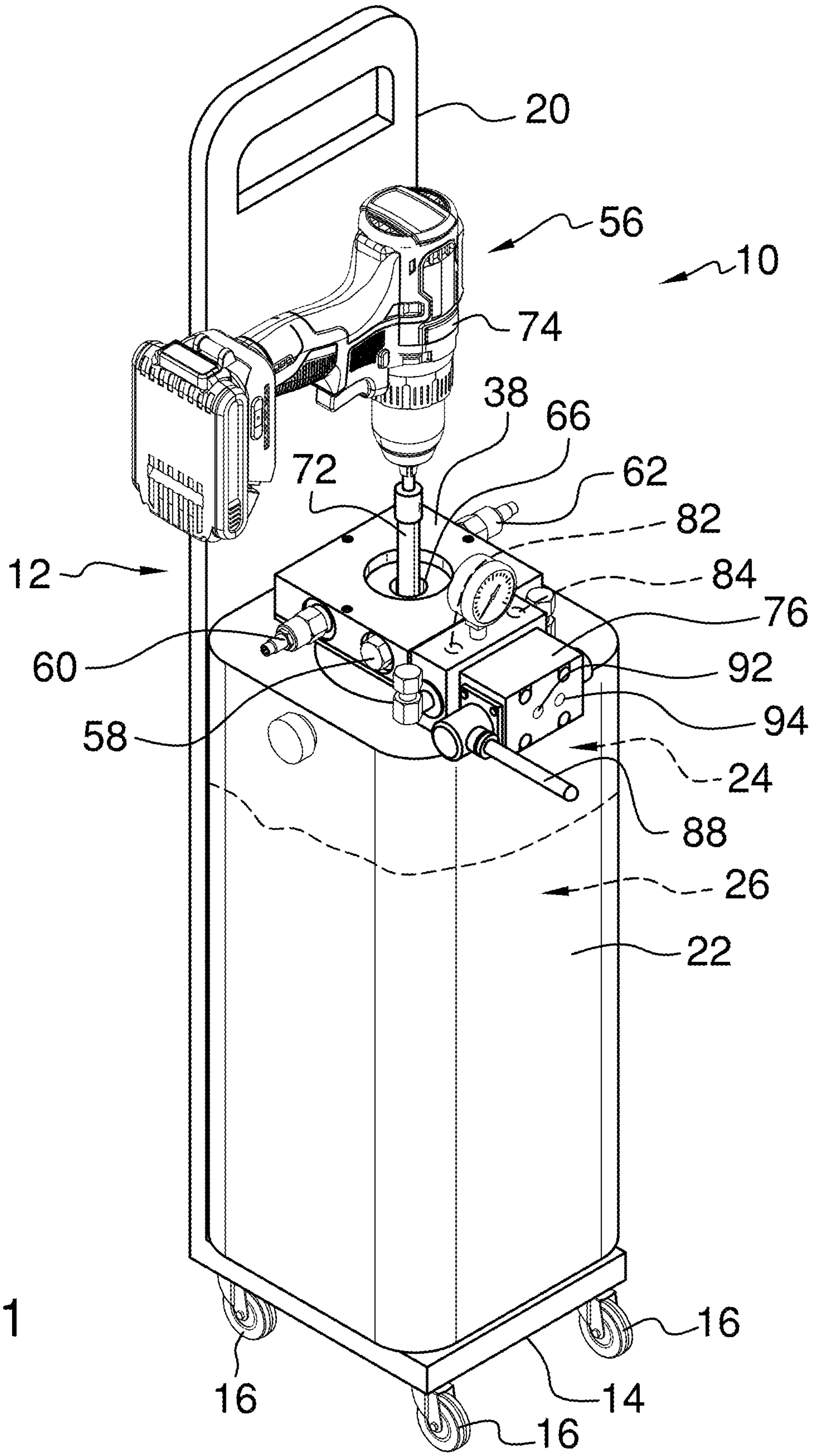
FIG. 1 is a top front side perspective view of a hand tool powered hydraulic fluid pump device according to an embodiment of the disclosure.
Figure 2:
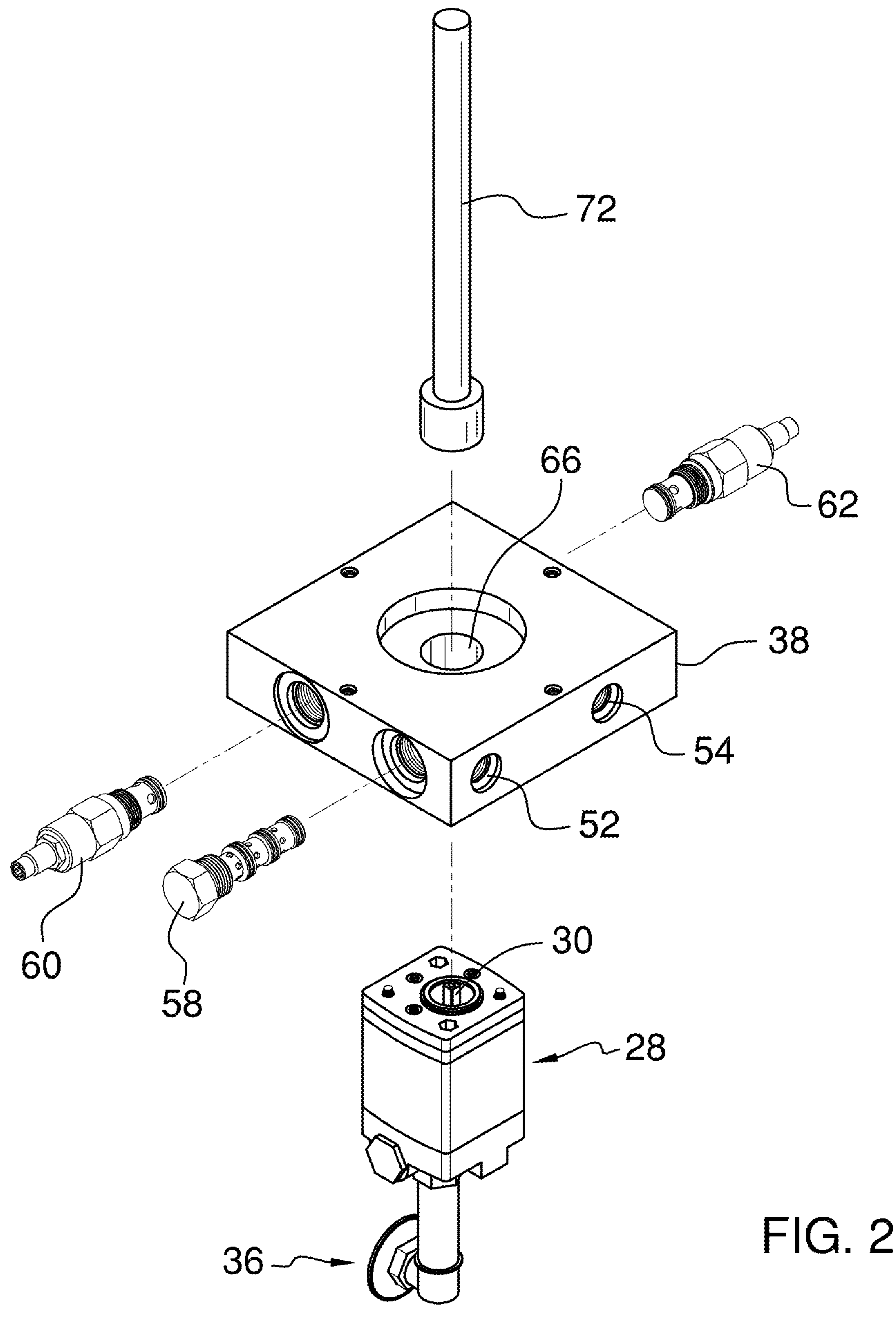
FIG. 2 is an exploded top front side perspective view of an embodiment of the disclosure.
Figure 3:
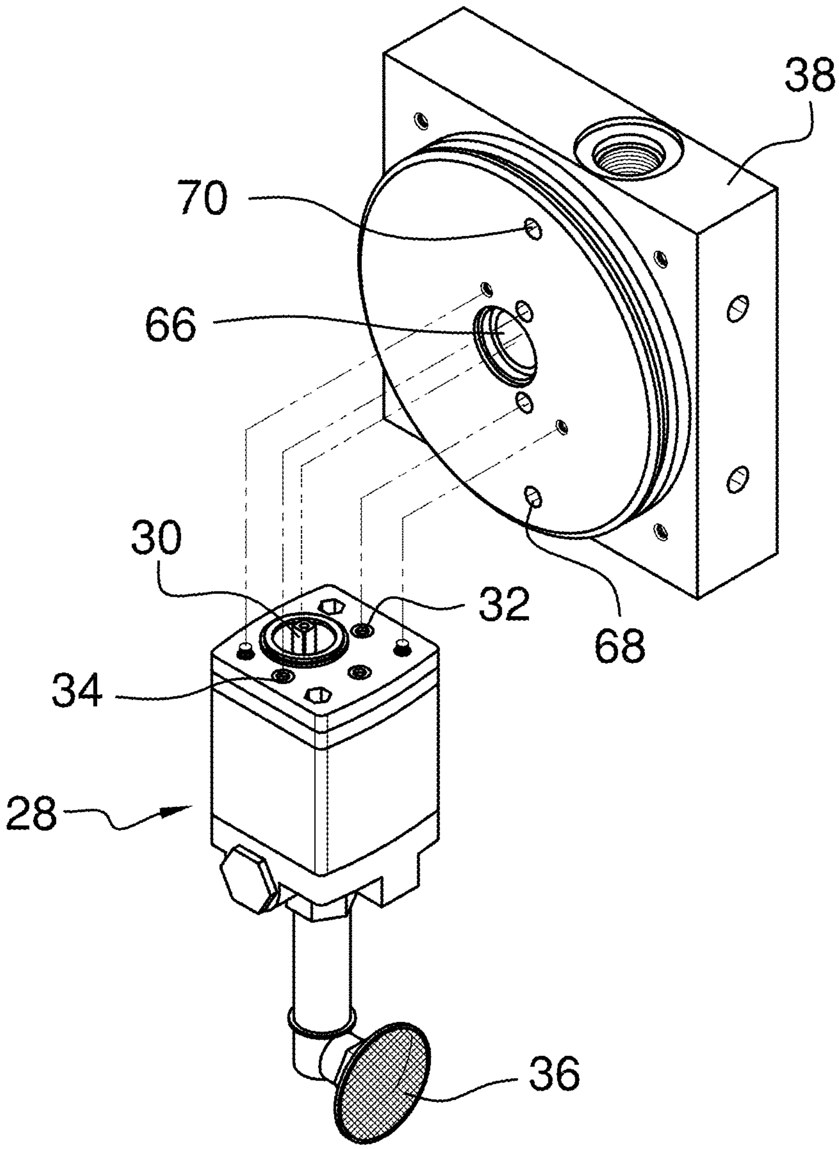
FIG. 3 is an exploded top front side perspective view of an embodiment of the disclosure.
Figure 4:
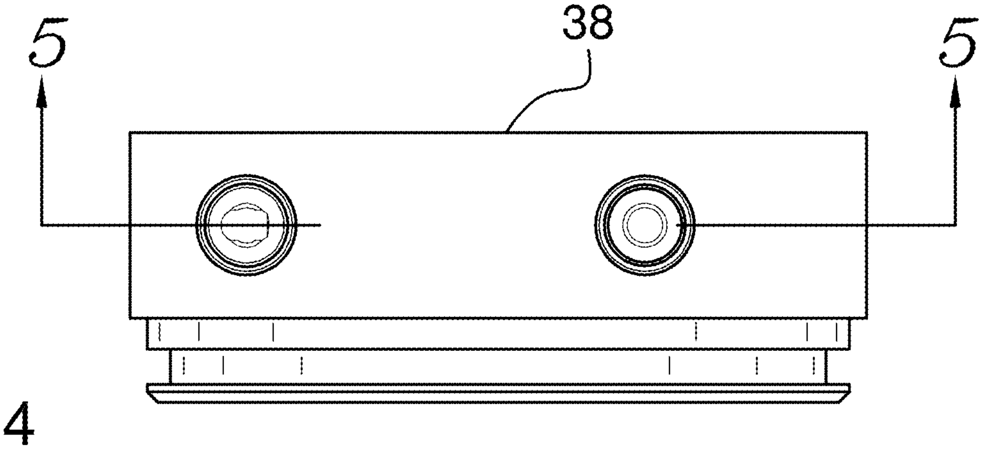
FIG. 4 is a front view of a diverter box an embodiment of the disclosure.
Figure 5:
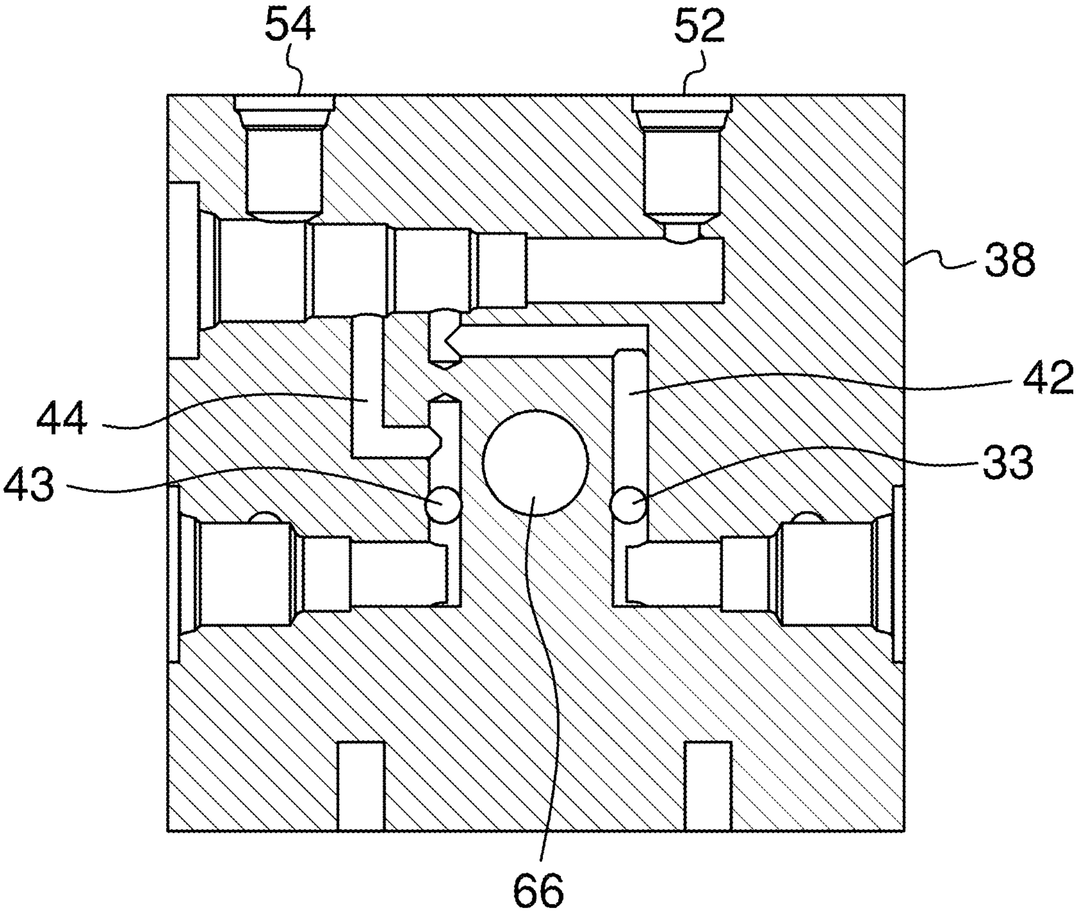
FIG. 5 is a cross-sectional view of an embodiment of the disclosure taken along line 5-5 of FIG. 4.
Figure 6:
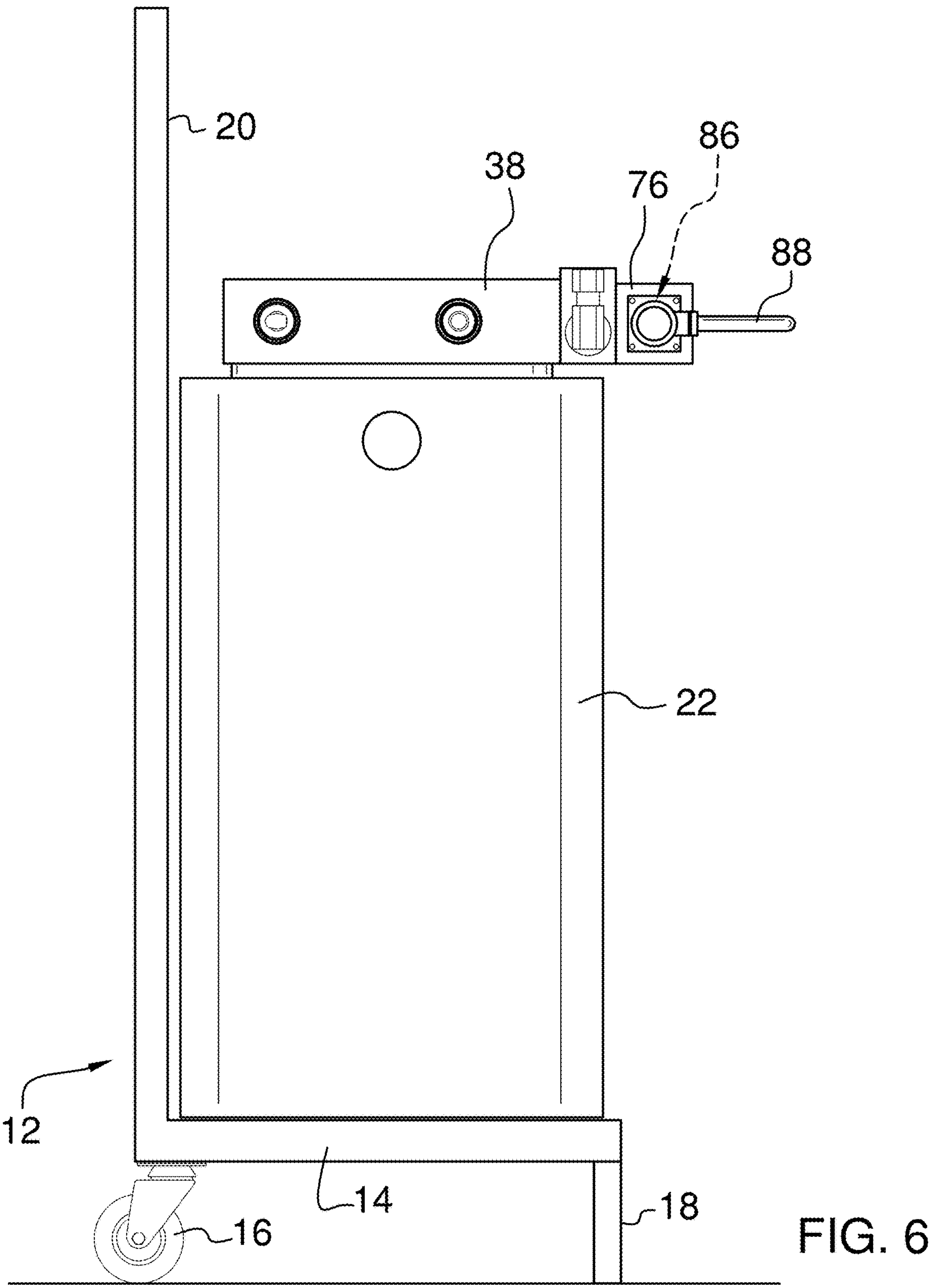
FIG. 6 is a side view of an embodiment of the disclosure.

With reference now to the drawings, and in particular to FIGS. 1 through 6 thereof, a new hydraulic fluid device embodying the principles and concepts of an embodiment of the disclosure and generally designated by the reference numeral 10 will be described.

As best illustrated in FIGS. 1 through 6, the hand tool powered hydraulic fluid pump device 10 generally comprises a cart 12 including a base 14. Each of a plurality of wheels 16 may be coupled to the base 14 to facilitate moving the cart 12. There may be four wheels 16, as would be in FIG. 1, or a pair of supports 18 and a pair of wheels 16 with the wheels 16 axially aligned to move the cart 12 by tipping the base 14 so the supports 18 are elevated, as in FIG. 6. Alternatively, it would be understood the cart 12 may be provided without any wheels 16, with only supports 18, or without any wheels 16 or supports 18. A handle 20 is coupled to the base 14 and extends upwardly from the base 14 to facilitate grasping and moving the cart 12.

A reservoir 22 is positioned on the cart 12. The reservoir 22 has an interior 24. A conventional hydraulic fluid 26 is positioned in the interior 24 of the reservoir 22. A pump 28 is positioned in the reservoir 22. The pump 28 has a pump shaft 30, a first fluid circulation port 32, a second fluid circulation port 34, and a fluid input 36. The pump 28 draws the hydraulic fluid 26 into the pump 28 through the fluid input 36. The pump 28 circulates the hydraulic fluid 26 out of the first fluid circulation port 32 and into the second fluid circulation port 34 when the pump shaft 30 is rotated.

A flow diverter 38 is coupled to the pump 28. The flow diverter 38 is coupled to the reservoir 22 and the pump 28 holding the pump 28 within the interior 24 of the reservoir 22. The flow diverter 38 includes a first fluid channel 42 in fluid communication with the first fluid circulation port 32 of the pump 28 via a first fluid opening 33. A second fluid channel 44 of the flow diverter 38 is in fluid communication with the second fluid circulation port 34 of the pump 28 via second fluid opening 43. A first connection port 52 of the flow diverter 38 is in fluid communication with the first fluid channel 42, and a second connection port 54 of the flow diverter 38 is in fluid communication with the second fluid channel 44. The pump 28 is provides the hydraulic fluid 26 from the reservoir 22 through the flow diverter 38 to a hydraulic operated machine connected to the first connection port 52 and the second connection port 54. A hand tool 56 is removably couplable to the pump shaft 30 to rotate the pump shaft 30. A shaft access aperture 66 extends through the fluid diverter 38. The shaft access aperture 66 is aligned with and exposes the pump shaft 30. The shaft access aperture 66 may be centered A diverter check valve 58 is coupled to the flow diverter 38. The diverter check valve 58 is operatively coupled to the first fluid channel 42 and the second fluid channel 44. A first channel relief valve 60 is coupled to the flow diverter 38 and operationally coupled to the first fluid channel 42. Similarly, a second channel relieve valve 62 is coupled to the flow diverter 38. The second channel relief valve 62 is operationally coupled to the second fluid channel 44. The fluid diverter 38 has a first return port 68 in fluid communication with the first channel relief valve 60. The first return port 68 is in fluid communication with the interior 24 of the reservoir 22 when the fluid diverter 38 is coupled to the reservoir 22. Similarly, the fluid diverter 38 has a second return port 70 in fluid communication with the second channel relief valve 62. The second return port 70 is also in fluid communication with the interior 24 of the reservoir 22 when the fluid diverter 38 is coupled to the reservoir 22.

The hand tool 56 may be a drill 74 or any other device which provides or drives rotation of a bit 72 which is enageable to the pump shaft 30. When the drill 74 is reversible, meaning it can provide rotation in opposite directions, the drill 74 may be used for rotating the pump shaft 30 selectively in a first direction and an opposite second direction. Thus, a flow direction of the hydraulic fluid 26 relative to the first connection port 32 and the second connection port 34 is reversed by reversing rotation of the pump shaft 30.

To enhance functionality a flow switch 76 may be coupled to the flow diverter 38 for use when a non-reversible hand tool 56 or drill 74, is used. The flow switch 76 includes a first diverter connection 82 fluidly couplable to the first connection port 52 of the flow diverter 38 and a second diverter connection 84 fluidly couplable to the second connection port 54 of the flow diverter 38. The flow switch 76 further includes a first dock port 92 configured for coupling to the hydraulic operated machine and a second dock port 94 configured for coupling to the hydraulic operated machine in a conventional manner similar to connecting the hydraulic machine to the first connection port 52 and second connection port 54. A switch valve 86 is fluidly coupled between the first diverter connection 82, the second diverter connection 84, the first dock port 92, and the second dock port 94. Operation of the flow switch 76 reverses flow direction of the hydraulic fluid 26 through the first dock port 92 and the second dock port 94. A lever 88 is operatively coupled to the switch valve 86 wherein operation of the lever 88 selectively reverses flow direction of the hydraulic fluid 26 through the first dock port 92 and the second dock port 94 when hydraulically connected to the hydraulically powered machine.

In use, the cart 12 can be moved easily to a convenient position. The hydraulically powered machine is connected to either the first connection port 52 and second connection port 54, or alternatively the first dock port 92 and second dock port 94. The hand tool 56 is engaged to the pump shaft 30 and used to rotate the pump shaft 30 such that the pump 28 pressurizes and moves the hydraulic fluid 26. This allows for operation of the hydraulically powered machine through use of the hand tool 56. As needed the flow direction of the hydraulic fluid 26 is reversed by either reversing rotation direction of the pump shaft 30, or through use of the switch valve 86.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable hand tool powered hydraulic fluid pump device comprising:
- a cart, said cart including:
  - a base, and
  - a handle coupled to said base;
- a reservoir positioned on said cart, said reservoir having an interior;
- a hydraulic fluid positioned in said interior of said reservoir;
- a pump positioned in said reservoir, said pump having a pump shaft, said pump having a first fluid circulation port, a second fluid circulation port, and a fluid input, said pump drawing said hydraulic fluid into said pump through said fluid input, said pump circulating said hydraulic fluid out of said first fluid circulation port and into said second fluid circulation port when said pump shaft is rotated;
- a flow diverter coupled to said pump, said flow diverter being coupled to said reservoir, said flow diverter including
  - a first fluid channel, said first fluid channel being in fluid communication with said first fluid circulation port of said pump,
  - a second fluid channel, said second fluid channel being in fluid communication with said second fluid circulation port of said pump,
  - a first connection port, said first connection port being in fluid communication with said first fluid channel,
  - a second connection port, said second connection port being in fluid communication with said second fluid channel, and
  - wherein said pump is configured to provide the hydraulic fluid from said reservoir, through said flow diverter, and to a hydraulic operated machine connected to said first connection port and said second connection port;

a hand tool, said hand tool being removably couplable to said pump shaft wherein operation of said hand tool rotates said pump shaft; and a flow switch couplable to said flow diverter, said flow switch including a first diverter connection fluidly couplable to said first connection port of said flow diverter, a second diverter connection fluidly couplable to said second connection port of said flow diverter, a first dock port configured for coupling to the hydraulic operated machine, a second dock port configured for coupling to the hydraulic operated machine, and a switch valve fluidly coupled between said first diverter connection, said second diverter connection, said first dock port, and said second dock port, and a lever operatively coupled to said switch valve wherein operation of said lever selectively reverses flow direction of said hydraulic fluid through said first dock port and said second dock port when hydraulically connected to said hydraulically powered machine.

2. The portable hand tool powered hydraulic fluid pump device of claim 1, further comprising a diverter check valve coupled to said flow diverter, said diverter check valve being operatively coupled to said first fluid channel and said second fluid channel.

3. The portable hand tool powered hydraulic fluid pump device of claim 1, further comprising a first channel relief valve coupled to said flow diverter, said first channel relief valve being operationally coupled to said first fluid channel.

4. The portable hand tool powered hydraulic fluid pump device of claim 1, further comprising a second channel relieve valve coupled to said flow diverter, said second channel relief valve being operationally coupled to said second fluid channel.

5. The portable hand tool powered hydraulic fluid pump device of claim 1, further comprising a shaft access aperture extending through said fluid diverter, said shaft access aperture being aligned with and exposing said pump shaft.

6. The portable hand tool powered hydraulic fluid pump device of claim 1, further comprising said fluid diverter having a first return port in fluid communication with a first channel relief valve, said first return port being in fluid communication with said interior of said reservoir when said fluid diverter is coupled to said reservoir.

7. The portable hand tool powered hydraulic fluid pump device of claim 1, further comprising said fluid diverter having a second return port in fluid communication with a second channel relief valve, said second return port being in fluid communication with said interior of said reservoir when said fluid diverter is coupled to said reservoir.

8. The portable hand tool powered hydraulic fluid pump device of claim 1, further comprising said hand tool being a drill, said drill being reversible for rotating said pump shaft selectively in a first direction and an opposite second direction whereby a flow direction of said hydraulic fluid relative to said first connection port and said second connection port is reversed by reversing rotation of said pump shaft.

9. The portable hand tool powered hydraulic fluid pump device of claim 1, wherein said cart further comprises a plurality of wheels coupled to said base.

10. A portable hand tool powered hydraulic fluid pump device comprising:

a cart, said cart including:

a base, and a handle coupled to said base;

a reservoir positioned on said cart, said reservoir having an interior;

a hydraulic fluid positioned in said interior of said reservoir;

a pump positioned in said reservoir, said pump having a pump shaft, said pump having a first fluid circulation port, a second fluid circulation port, and a fluid input, said pump drawing said hydraulic fluid into said pump through said fluid input, said pump circulating said hydraulic fluid out of said first fluid circulation port and into said second fluid circulation port when said pump shaft is rotated;

a flow diverter coupled to said pump, said flow diverter being coupled to said reservoir, said flow diverter including a first fluid channel, said first fluid channel being in fluid communication with said first fluid circulation port of said pump, a second fluid channel, said second fluid channel being in fluid communication with said second fluid circulation port of said pump, a first connection port, said first connection port being in fluid communication with said first fluid channel, a second connection port, said second connection port being in fluid communication with said second fluid channel, and wherein said pump is configured to provide the hydraulic fluid from said reservoir, through said flow diverter, and to a hydraulic operated machine connected to said first connection port and said second connection port;

a hand tool, said hand tool being removably couplable to said pump shaft wherein operation of said hand tool rotates said pump shaft;

a diverter check valve coupled to said flow diverter, said diverter check valve being operatively coupled to said first fluid channel and said second fluid channel;

a first channel relief valve coupled to said flow diverter, said first channel relief valve being operationally coupled to said first fluid channel;

a second channel relieve valve coupled to said flow diverter, said second channel relief valve being operationally coupled to said second fluid channel;

a shaft access aperture extending through said fluid diverter, said shaft access aperture being aligned with and exposing said pump shaft;

said fluid diverter having a first return port in fluid communication with said first channel relief valve, said first return port being in fluid communication with said interior of said reservoir when said fluid diverter is coupled to said reservoir; and said fluid diverter having a second return port in fluid communication with said second channel relief valve, said second return port being in fluid communication with said interior of said reservoir when said fluid diverter is coupled to said reservoir; and a flow switch couplable to said flow diverter, said flow switch including a first diverter connection fluidly couplable to said first connection port of said flow diverter, a second diverter connection fluidly couplable to said second connection port of said flow diverter, a first dock port configured for coupling to the hydraulic operated machine, a second dock port configured for coupling to the hydraulic operated machine, a switch valve fluidly coupled between said first diverter connection, said second diverter connection, said first dock port, and said second dock port, and a lever operatively coupled to said switch valve wherein operation of said lever selectively reverses flow direction of said hydraulic fluid through said first dock port and said second dock port when hydraulically connected to said hydraulically powered machine.

11. The portable hand tool powered hydraulic fluid pump device of claim 10, further comprising said hand tool being a drill, said drill being reversible for rotating said pump shaft selectively in a first direction and an opposite second direction whereby a flow direction of said hydraulic fluid relative to said first connection port and said second connection port is reversed by reversing rotation of said pump shaft.

12. The portable hand tool powered hydraulic fluid pump device of claim 10, wherein said cart further comprises a plurality of wheels coupled to said base.

* * * * *